Dec. 27, 1966 E. J. BENSON 3,294,553
IMMERSION FREEZING OF STRAWBERRIES
Filed July 11, 1963
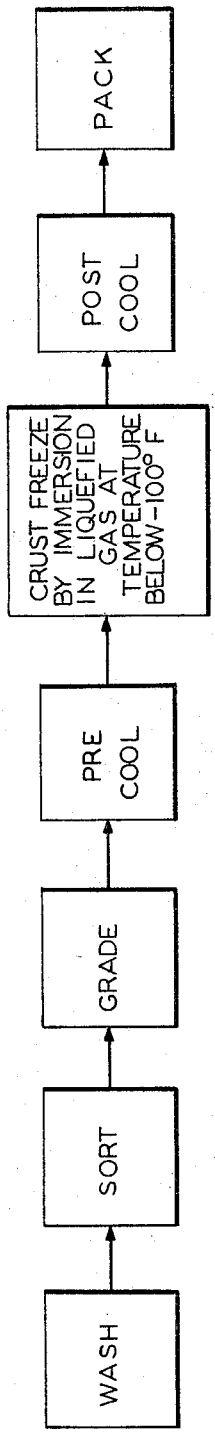
INVENTOR.
ERNEST J. BENSON
BY Edmund W. Bopp
AGENT United States Patent Office 3,294,553
Patented Dec. 27, 1966

3,294,553
IMMERSION FREEZING OF STRAWBERRIES
Ernest J. Benson, Madison, Wis., assignor to Air Reduction Company, Incorporated, New York, N.Y., a corporation of New York
Filed July 11, 1963, Ser. No. 294,417
2 Claims. (Cl. 99—193)

This invention pertains to the preservation of fresh fruit and the like and more particularly to the preservation of strawberries by freezing.

The gastronomic appeal of garden fresh red ripe strawberries is well recognized and undenied. Unfortunately the vine ripened berries are highly susceptible to bruising and spoilage and can be kept in good condition for but a very short time by employing conventional methods of handling and storing fresh fruits and vegetables. As a consequence it hs frequently been found necessary to pick the berries in an immature condition to enable them to satisfactorily withstand shipment to the market. Even this expedient did little to extend the preservation time and it is generally conceded that fruit ripened off the vine lacks the flavor and quality of the vine ripened berry. Accordingly it has been found necessary in order to make strawberries available for consumption out of season or at points remote from the areas in which they are grown to preserve them in sugar syrup by conventional fruit canning and preservation means and more recently to preserve them by freezing in syrup in a frozen unit containing a multiplicity of berries or berry slices or by freezing the berries individually.

Of these methods of preservation, the "individual quick frozen (I.Q.F.) or "loose pack" berry, when thawed, most closely resembles the fresh fruit product. Such berries are frozen by subjecting them to a sub-freezing gaseous blast in a "tunnel" for a sufficient time to freeze the fruit solidly throughout. This conventionally requires freezing times of up to several hours. While this freezing is often referred to as "quick freezing," there is still substantial cell destruction as a result of crystal growth during the freezing process and as a result of the delicate nature of the berry structure. As a result when the berry is thawed it tends to lose its firmness and to "slump" and lose its shape. It is also characteristic of the I.Q.F. berries frozen according to the prior art to lose from 20% to 50% of the natural juices upon thawing in what is known as "drip loss." In addition berries so frozen lose from 4% to 6% of their weight by dehydration during freezing so that not only is the constitution of the berry altered, but the net weight of the frozen product is substantially less than the weight of the fresh fruit prior to freezing, which in some instances could represent a significant economic factor in the distribution of the product.

It is therefore an object of this invention to provide improved methods of preserving fruit, such as mature strawberries by freezing.

Another object is to produce an individually quick frozen strawberry which when thawed will have substantially the characteristics of the fresh fruit before freezing.

Still another object of the invention is to provide a novel method of freezing strawberries that will enable the berries to be preserved for long periods of time and be transported over long distances without adverse effect, whereupon the fruit when thawed retains substantially all of the desirable characteristics of the vine ripened unfrozen fresh fruit.

These and other objects and advantages of the invention will be pointed out or will become apparent from the following description and the accompanying drawing.

In accordance with the present invention the strawberries are individually quick frozen by immersion in liquefied gas at cryogenic temperatures (below $-100°$ F.) for a very short period of time, followed by a post-cooling period in a sub-freezing atmosphere. In order to derive the benefits sought by the objects of this invention, it is essential that the immerision in the cryogenic fluid, such as liquid nitrogen, be restricted to a time that will freeze only an outer portion of the berry and which in itself will not provide sufficient residual refrigeration in the frozen portion of the berry to freeze solidly the remainder of the berry. Additional refrigeration must be supplied during the post-cooling period to effect the complete freezing. When thawed, berries so frozen retain substantially all of the characteristics of the fresh berry.

The preferred process is diagrammatically illustrated in the accompanying drawing. A more detailed understanding of the novel method and product may be obtained from the following detailed description.

In the preferred practice of the present invention the fresh picked berries are first thoroughly washed and inspected to remove therefrom deformed and defective berries and any foreign matter that may be present. The fruit is then sorted to select only the mature fruit. Since the immersion time in the cryogenic liquid is critical and depends on the maturity of the berry it would obviously be impossible to obtain the best results if the maturity of the fruit in any one batch varies substantially. While immature berries can be satisfactorily preserved in accordance with the present invention, the thawed product would have the characteristics of the immature fruit. Over-ripe fruit should be avoided where possible because such berries are already subject to cell destruction by virtue of the ripening process and this cell destruction would be further promoted by the freezing process. Also as will be seen hereinafter the immature berry requires a shorter freezing cycle than the mature fruit and if efforts are made to simultaneously process berries of widely divergent states of maturity, the immature fruit would be over-frozen or the fully ripened berries would not be sufficiently frozen to obtain the desired results.

The berries are next graded for size. In accordance with the present process the berries must be only partially frozen in the initial immersion in the cryogenic liquid and berries of different sizes require different immersion times for optimum results. Accordingly it is preferred that berries be graded for size, placing berries of similar size in the same group. It has been found that satisfactory results can be obtained if, for example the berries are separated into grades of the following order:

Grade I: ⅝" or less (diameter at the widest point).
Grade II: ⅝" to 1¼"
Grade III: 1¼" up to 2"
Grade IV: Over 2"

It will be found that the majority of berries fall within one of these grades.

While it is not considered necessary for the purpose of this present invention to pre-cool the berries prior to the freezing process, it has been found desirable from the economic point of view to remove field heat by pre-cooling at some temperature above the freezing temperature. This can best be done in connection with the present process by utilizing residual refrigeration in the waste nitrogen vapors by admitting the same to a pre-cooling zone in which the strawberries are stored prior to processing.

The next step in the process is to immerse the individual berries in a low temperature liquefied gas for a short critical period to cause each berry to be very rapidly frozen a certain distance toward its center from the surface without it being wholly frozen. It is essential that the immersion liquid be at a temperature below $-100°$ F. and that it be a gas at normal frozen food storage temperatures. This assures its complete absence from the finished product even though it is in direct contact with the product in the immersion step. It must also be non-toxic and satisfy the legal requirements for use in food processing. Refrigerated brine solutions and the like are not satisfactory. Their temperature is not sufficiently low and they have the disadvantage of combining in the product by osmotic action. Liquid nitrogen (−320° F.) and liquid nitrous oxide (−127° F.) are liquefied gases that are readily available and well suited to the needs of the process.

In order to obtain uniform results in this step it is preferred to allow the berries to separate in the bath so that the cryogenic liquid can contact substantially the entire surface of each berry uniformly. In the preferred form of the invention the berries are immersed in liquid nitrogen. Rapid evolution of gaseous nitrogen occurs when the relatively warm berry becomes immersed in liquid nitrogen. This tends to agitate the liquid and cause uniformity in the freezing process. It will be noted that the berries tend to act buoyant due to this rapid evolution of gas at the berry surface until the berry is frozen. The freezing process can be conducted as a batch operation by placing the berries loosely in a basket or other container that is dipped into the liquid nitrogen for the prescribed time, and then promptly removed. Alternatively the immersion freezing can be conducted on a continuous basis by dropping the berries into the cryogenic liquid individually and transporting the berries through the liquefied gas on a conveyor so regulated that the elapsed time between entry into the bath and the removal therefrom is closely controlled and the same for all berries.

As previously stated a most important aspect of this invention is precise control of the extent of freezing during the period of immersion in the cryogenic liquid. It has been found for example, that if the immersion time is too short cell destruction will be excessive and the fruit after thawing will exhibit the undesirable characteristics now found in the blast frozen berry. If the immersion period is too long the berries tend to split or crack which not only detracts from their appearance, but produces excessive drip loss. While the time of immersion depends in part on the variety of berry being processed and the state of maturity, it has been found that the immersion should be just long enough to crust-freeze the berry to the point where about 40%–60% of its volume is solidly frozen. It has been found from experience, and it should be useful as a guide to others when using liquid nitrogen at atmospheric pressure to immerse berries in the grade identified hereinabove as Grade I, i.e., ⅝" or less in diameter, for a period of from 20 to 28 seconds. Berries of Grade II, i.e., ⅝" to 1¼" in diameter, should be immersed in the neighborhood of from 28 to 35 seconds. Berries of Grade III, i.e., from 1¼" up to 2", for 35 to 45 seconds, and berries of Grade IV, i.e., larger than 2" in diameter, for the full 45 seconds. While it is preferred to carry out the crust-freezing step by immersing of the berries in a liquefied gas such as liquid nitrogen, this step can alternatively be carried out by spraying such a liquefied gas on the surface of the berries.

In accordance with the present invention the immersion of the fruit in liquid nitrogen should be of such duration that the residual refrigeration resulting from the freezing and sub-cooling of the crust toward the −320° F. of the liquid nitrogen is insufficient in itself to cause the temperature of the berry to be below freezing when the temperature is equalized from surface to center unless the berry is maintained in a sub-freezing atmosphere after removal from the liquid nitrogen. To be more explicit on this point it is known in the art to freeze articles, including specifically certain fruits and vegetables by freezing and supercooling the outer zone extending toward the center of the object from its surface to such an extent that the freezing process will continue toward the center after removal from the freezing environment as a result of the heat absorbed from the center by the super-cooled crust. Where such freezing techniques have been used in the past it has been the practice to impart sufficient residual refrigeration into the crust to not only freeze the center after withdrawal from the sub-freezing environment, but also to contain in the super-cooled crust sufficient refrigeration to prevent surface melting during or immediately after the freezing of the center (i.e., after temperature equalization takes place). The present invention is exactly contrary to this concept in that the super-cooled crust must not contain sufficient residual refrigeration to freeze the berry throughout its entire cross-section, i.e., from surface to core. Rather in accordance with the present invention the super-cooled frozen crust created by immersion in the liquid nitrogen will not in itself freeze the berry from its surface to the center unless the berry after removal from the liquid nitrogen is maintained in a post-cooling zone that is itself below freezing.

To effect this latter step it is preferred to hold the berries after removal from the liquid nitrogen in such a tempering or post-cooling zone in which the atmosphere is maintained below freezing and preferably below 0° F., but not so low as to further sub-cool the frozen crust. Under these conditions equalization of the temperature throughout the cross-section of the berry will take place resulting in a solidly frozen berry having a dry surface even though the residual refrigeration in the crust was insufficient in itself to effect this result. There is considerable latitude in the temperature that can be maintained in the post-cooling zone and still obtain the benefits of the present invention. If the post-cooling zone utilizes an atmosphere comprising essentially the vapors derived from the boiling liquid nitrogen, it may be sufficient to maintain the berries in the post-cooling zone for a period of from only 2 to 7 minutes. On the other hand if the post-cooling zone is refrigerated by conventional mechanical refrigeration at a temperature in the vicinity of 0° F. it may be necessary to maintain the berries in the post-cooling zone for a considerably longer period. In some instances this may be one hour or more.

After an appropriate post-cooling period the berries may be packed and handled in exactly the same way as any other frozen strawberry.

Without professing to know the reason for the results, it has been found by experiment that if the graded and sorted berries are crust-frozen by immersion in a cryogenic liquid such as liquid nitrogen or nitrous oxide so that about 40%–60% of the volume is frozen and so that the residual refrigeration content in the crusts is insufficient in itself to solidly freeze the berry from surface to core, and that if the so crust-frozen berry is held in a sub-freezing post-cooler until the temperature equalizes and the berry is solidly frozen, that the product so produced possesses vastly superior characteristics to berries frozen by the processes known in the prior art and in fact produces a product that closely resembles the fresh berry. After thawing the berry so produced retains the appearance and shape of the fresh berry, and for this reason alone it has a significant sales appeal and economic advantage. Strawberries preserved according to the present invention, retain much more of their original texture and firmness than had heretofore been possible. A standard measure of the quality of a frozen strawberry is the drip loss. Drip loss is the amount of juice lost from the berry on thawing. It is believed that this loss results primarily from the destruction of the delicate cells of the fruit by the formation of ice crystals during freezing which after thawing, permit the juices to drain out of the damaged cell structure. The conventional individual quick frozen berry loses anywhere from 20% to 50% of its total weight in drip loss. In accordance with the present invention, drip loss is less than 5% and can be substantially 0%. Another advantage of the present invention is that this method of freezing substantially completely eliminates freezer dehydration. Conventional blast frozen I.Q.F.

berries lose from 4% to 6% of their weight by dehydration during the freezing process. Berries frozen in accordance with the present invention have no measurable dehydration loss. This is an obvious economic advantage inasmuch as berries are bought and sold by weight. Freezer dehydration also detracts from the quality of the product and its elimination enables the product to reach the consumer with more of the characteristics of the fresh fruit. Still another advantage of berries preserved according to the present invention is that there is no toughening of the outer "skin" as is usual when the berries are blast frozen.

It will be evident that as a result of this invention ripe strawberries can be preserved by freezing so that the product when thawed more closely resembles the fresh fruit than has heretofore been possible. The invention is not limited to the form specifically disclosed but may be used in other ways without departure from its spirit as defined by the following claims.

I claim:

1. The method of preserving strawberries by freezing which essentially comprises immersing the strawberries in a liquefied gas selected from the group consisting of nitrogen and nitrous oxide until the berries are frozen from the surface to a depth such that not more than about 40%–60% of the volume of each berry is frozen, permanently removing the berries from immersion in the liquefied gas before about at most 60% of the volume of each berry is frozen, said frozen volume containing insufficient residual refrigeration in itself to freeze the berry throughout its cross section, transferring the berries from the liquefied gas to a tempering zone having a gaseous atmosphere evolved from said liquefied gas and of a temperature below about 0° F., maintaining the berries in the tempering zone until the temperature in each berry equalizes throughout its cross-section at a sub-freezing level, and thereafter removing the berries from the tempering zone.

2. In the art of preserving strawberries by freezing the improvement which essentially comprises immersing the berry in liquid nitrogen at atmospheric pressure for a period of more than about 20 seconds to freeze a crust thereon, said frozen crust containing insufficient residual refrigeration in itself to freeze the berry throughout its cross section, permanently removed the berries from immersion in the liquefied gas before about at most 45 seconds, and thereafter freezing the unfrozen core of the berry by maintaining the berry in a gaseous atmosphere evolved from the liquid nitrogen and of a temperature below about 0° F. but substantially warmer than the temperature of liquid nitrogen for a sufficient time to allow the temperature to equalize throughout the cross-section of the berry at a value below the freezing temperature of the berry.

References Cited by the Examiner

UNITED STATES PATENTS 3,039,276  6/1962  Morrison _____ 62—64

OTHER REFERENCES

Tressler et al.: The Freezing Preservation of Foods, vol. I, Avi Pub. Co., 1957, pp. 550–558.

A. LOUIS MONACELL, *Primary Examiner.*

R. S. AULL, *Assistant Examiner.*